United States Patent Office 3,033,766
Patented May 8, 1962

3,033,766
PRODUCTION OF BORANE DERIVATIVES
William H. Schechter, Evans City, Pa., assignor, by mesne assignments, to Callery Chemical Company, Pittsburgh, Pa., a corporation of Pennsylvania
No Drawing. Filed Nov. 13, 1953, Ser. No. 392,051
21 Claims. (Cl. 204—59)

This invention relates to the production of derivatives of borane such, for example, as boron hydrides and amine boranes.

The borane radical ($BH_3$) may exist in a transitory state but it has not been isolated. It is, however, the parent of a wide variety of compounds containing boron and hydrogen, all of which may be considered as borane derivatives, and which are useful themselves or for the preparation of other boron compounds. For example, diborane ($B_2H_6$) may be represented as $H_3B:BH_3$. It, like other boron hydrides, is useful for various purposes as, for example, as a high energy fuel, or for conversion to ammoniates, e.g., diborane diammoniate ($B_2H_6:2NH_3$), or other compounds containing boron and hydrogen. Under appropriate conditions of temperature and pressure diborane affords a source of the higher boron hydrides, for instance stable pentaborane ($B_5H_9$). Such compounds as the amine-boranes ($R_xNH_{3-x}:BH_3$) may likewise be made by reacting diborane with an amine; thus, at low temperatures diborane reacts with dimethylamine ($Me_2NH$) to produce dimethylamine-borane ($Me_2NH:BH_3$).

Such amine-boranes can be used to prepare alkylaminodiboranes, or because of their great stability toward hydrolysis they are suited to use as hydrocarbon fuel additives. Thus, when added to gasoline they serve to reduce the catalytic effect of deposited lead or carbonaceous products in a gasoline engine. It has been found that lead or carbonaceous deposits in a gasoline engine have the effect of increasing the minimum octane requirements of the engine. As the deposits in a gasoline engine increase there is normally an increase in the minimum octane rating of the fuel required for knock-free operation. Boron compounds which are resistant to hydrolysis and soluble in gasoline have the effect of preventing the aforementioned increase in the octane requirements of an engine. In a similar manner these fuel additives function to prevent an increase in the minimum cetane requirements of a diesel engine.

The classical method of making boron hydrides involves the treatment of a metallic boride with an acid but this practice is cumbersome, protracted, results in very low yields, and requires complicated apparatus that is difficult to manipulate. Another way of making boron hydrides is to subject a mixture of a boron halide ($BX_3$), such as the fluoride or bromide, and hydrogen ($H_2$) to a high intensity electric arc followed by separation and recovery of the chloroboranes and their conversion into the corresponding boron hydrides. This practice is open to much the same difficulties and objections as the foregoing one.

Various other processes for making diborane and other boron hydrides are known in which use is made of boron fluoride, as by reaction with lithium hydride (LiH), calcium aluminum hydride [$Ca(AlH_4)_2$], and others, such as metallic alkoxyborohydrides, but they are objectionable also in that the sources of hydrogen are expensive, not only per se but because, per unit of weight, they supply a very small proportion of the hydrogen necessary, or because they are difficult to make or handle.

The primary object of the present invention is to provide a method of making borane derivatives that is simple and direct, easily practiced, makes use of readily available and relatively inexpensive materials that are easily handled, does not require unduly complicated or costly apparatus, and avoids the foregoing and other related disadvantages.

Other objects will appear from the following specification.

The invention is predicated upon my discovery that borane derivatives may be made readily and easily by electrolyzing, between an anode and a cathode, an ionic borohydride in a non-aqueous solvent that is inert to the borohydride. Using an anode and a solvent inert to the electrode reactions, boron hydrides may be formed in this way. The anode product is wholly or largely diborane at lower temperatures, while at higher temperatures substantial proportions of stable pentaborane are formed, and under some conditions solid boron hydrides are deposited on the anode. Where the solvent used is reactive with the anode product, other forms of borane derivatives result from reaction between the discharged anion and the solvent itself, as will appear more fully hereinafter. Presumably, in the practice of the invention the borohydride ion ($BH_4^-$) is discharged at the anode with production of borane ($BH_3$) and hydrogen (H); the borane immediately forms diborane or mixtures of it with higher boranes, or it reacts with the solvent, for instance to form an amine-borane.

A variety of non-aqueous solvents that are inert to the ionic borohydrides are available for the purposes of the invention. One such class of solvents consists of a fused salt or fused salt mixtures. As an example, a solution of 17 percent by weight of sodium borohydride ($NaBH_4$) in lithium chloride-potassium chloride (LiCl—KCl) eutectic electrolyzed at 400° C., using a carbon anode and a carbon cathode results in the deposition of solid boranes on the anode from which they are scraped. At lower temperatures volatile boranes are produced, as by electrolyzing 40 percent by weight of sodium borohydride in lithium borohydride ($LiBH_4$) at 240° C. using a carbon cathode and a ferrous anode, whereby diborane is evolved at the anode. Again, electrolysis of equimolar proportions of potassium borohydride ($KBH_4$) and lithium borohydride using a platinum anode and a carbon cathode gave a 70 percent yield of diborane at current densities less than 60 milliamperes per square centimeter when electrolyzed at 5 volts and 160° C.; some pentaborane was produced also.

Diborane containing 10 to 30 percent of stable pentaborane is produced by electrolysis between a platinum anode and a steel cathode at a current density of 50 ma. per sq. cm. at about 100° C. of a fused melt of lithium borohydride, potassium borohydride and sodium borohydride in eutectic proportions. A mixture of 4 mols of aluminum chloride ($AlCl_3$) and 1 mol each of sodium chloride (NaCl), potassium chloride (KCl) and lithium chloride (LiCl) melts at about 75° C. Upon the addition of sodium borohydride and electrolysis at about 80° C. aluminum borohydride [$Al(BH_4)_3$] is formed and diborane evolved at the anode.

A wide variety of other salts may be used for fused salt electrolysis of ionic borohydrides. A few examples among the many possible and that will be readily perceptible to those skilled in the art are the eutectic composition of aluminum chloride, lithium chloride and potassium chloride, and the eutectic $$AlCl_3—LiCl—KCl—NaCl$$

which melts at 62° C. It is now preferred to use the low melting salts and salt combinations, especially those of the alkali metals because the anode product is largely or wholly $B_2H_6$ which is useful itself or can be converted to higher boranes.

Another class of solvents utilizable for the purposes of the invention is represented by amines and ammonia ($NH_3$), with which the anode product, presumably $BH_3$, is reactive. Electrolysis of, for example, sodium borohydride in liquid ammonia results in the production of diborane diammoniate which can be converted to borazene ($B_3N_3H_6$) by heating at 250° C., or used for other purposes.

The ionic borohydrides are adequately soluble likewise in amines. For example, sodium borohydride is soluble to the extent of about 4 percent by weight in dimethylamine ($Me_2NH$) at 2° C. When such a solution is electrolyzed, as disclosed and claimed in an application filed by me and others November 17, 1953, Serial No. 392,744, using an inert anode and a cathode adapted to collect the sodium (Na) deposited thereat, suitably a mercury (Hg) cathode, hydrogen is liberated at the anode. At the end of the run the electrolyte is removed from the cell, the excess amine is evaporated to leave a residual solid that may be extracted with ethyl ether or petroleum ether to purify the reaction product. Analysis of the recrystallized product shows it to correspond to dimethylamine-borane ($Me_2NH:BH_3$). Other amines may similarly be used to produce amine-boranes, e.g., pyridine ($C_5H_5N$) as solvent produces pyridine borane ($Pyr:BH_3$).

Experience has shown also that borazene derivatives may be produced, in accordance with the invention, by electrolysis of $NaBH_4$, or other ionic borohydrides, dissolved in a primary amine ($RNH_2$). Thus, using methylamine there may be produced N-trimethylborazene.

Still another class of solvents inert to the ionic borohydrides that may be used are the dialkyl ethers of poly-1,2-ethanediols: $R(OCH_2CH_2)_nOR$ where R is an alkyl radical and $n$ is 2 or greater whole number. Examples of such ethers are the dimethyl ethers of diethylene glycol, of triethylene glycol, and of tetraethylene glycol. Similarly, the diethyl and other lower dialkyl ethers may be used as solvents for the ionic borohydrides, as well as the lower alkyl ethers of the 1,3-propanediols. Thus, at 40° C., 10.5 percent by weight of sodium borohydride is soluble in the dimethyl ether of diethylene glycol, while at 25° C. 13 percent is soluble in the dimethyl ether of triethylene glycol, and 15 percent in the dimethyl ether of tetraethylene glycol. Electrolysis of sodium borohydride in these ethers, using inert electrodes, results in deposition of sodium at the cathode and formation of boranes at the anode.

It may be desirable to pretreat these glycol ethers to dehydrate them prior to electrolysis. This may be accomplished by, for example, bubbling diborane into the ether to effect a substantial absorption of the gas which in some manner not wholly understood conditions it for electrolysis to produce the desired boron hydride. Or, the glycol ether may be stored over sodium hydride (NaH), say for 12 hours, or over other dehydrating agents, to precondition it.

For most purposes, as in the electrolysis of fused salt solutions of borohydrides it is preferred to use inert electrodes such, for example, as a graphite cathode and carbon, platinum, or iron or steel anodes. Where sodium is deposited at the cathode it is generally desirable to use mercury for that purpose to avoid the development of sodium fog within the electrolyte, the sodium amalgam formed being treated readily, as known in the electrolytic art, for recovery of the sodium and of the mercury. For special purposes there may be used anodes that are reactive with the discharge products of the borohydride ion. Likewise, gases reactive with the nascent $BH_3$ may be passed to the anode, e.g., carbon monoxide to form borane carbonyl $BH_3:CO$. In a similar manner gases, solids, or liquids which are reactive with the nascent $BH_3$ may be dissolved in the inert solvent and the borane derivative thereof produced at the anode. In this manner it is possible to get the borane derivative of materials in which $NaBH_4$ is not soluble. As an example $NaBH_4$ is soluble in $NH_3$ but is insoluble in $(CH_3)_3N$. It is therefore not possible to obtain trimethylamine-borane by electrolysis of $NaBH_4$ in trimethylamine. However, $NaBH_4$ and trimethylamine are both soluble in ammonia and electrolysis of such a solution will produce trimethylamine-borane.

The following table further exemplifies the practices under the invention, using sodium borohydride, by way of example only:

|  | Run 1 | Run 2 | Run 3 |
|---|---|---|---|
| Solvent | Dimethylamine | Fused borohydrides | Fused $AlCl_3$—$LiCl$—$NaCl$—$KCl$. |
| Temp. (° C.) | 7 | 150 | 80. |
| Cathode | Hg | Carbon | Carbon. |
| Anode | Pt | Pt | Do. |
| Cathode C.D. (amp./cm.²) | 0.035 |  | 0.014. |
| Anode C.D. (amp./cm.²) | 0.12 | 0.086 | 0.014. |
| Current (amps.) | 3 | 0.56 | 0.1. |
| Voltage (volts) | 20 | 2.5 | 4.6. |
| Product | $(CH_3)_2NHBH_3$ | $B_2H_6$ | $B_2H_6$. |
| Curr. eff. (percent) | 75 | 70 | 73. |

In run 1 there was used about 4 percent by weight of sodium borohydride. In run 2 there was used a fused mixture of lithium borohydride and potassium borohydride. In run 3 the electrolyte was a eutectic mixture of the chlorides.

As an example of the use of the dialkyl ethers of poly 1,2 ethanediols, diborane has been produced at a current efficiency of 63 percent by electrolysis of 10 percent by weight of solutions of $NaBH_4$ in tetraethylene glycol dimethyl ether at 50°–60° C. and a constant current of 100 milliamperes, using a graphite anode and a mercury cathode.

Although the invention has been described with especial reference to sodium borohydride, it is to be understood that it is applicable also to other ionic (as distinguished from covalent) borohydrides such as those of the alkali metal and alkaline earth metals, and such borohydrides as tetramethyl ammonium borohydride.

These ionic borohydrides may be represented as $M(BH_4)_x$ where M is an ion of the group consisting of alkali metals and alkaline earth metals, and $x$ is the valence of the ion.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. That method of making a borane comprising electrolyzing with an inert anode an alkali metal borohydride in a dialkyl ether of a polyglycol and thereby producing a borane at the anode.

2. A method of making a borane derivative of the group consisting of polymerization products of borane ($BH_3$) and reaction products of borane, comprising electrolyzing with an inert anode a solution of an ionic borohydride, $M(BH_4)_x$, where M is an ion of the group consisting of alkali metals and alkaline-earth metals, and $x$ is the valence of the M ion, in a non-aqueous solvent inert to the borohydride, and recovering said borane derivative discharged at the anode.

3. A method in accordance with claim 2 in which there is present in said solvent a substance reactive with the borohydride ion discharged at the anode, and in which there is recovered reaction product of said reactive substance and said discharged borohydride ion.

4. A method according to claim 2 in which said non-aqueous solvent is itself reactive with borane whereby there is produced at the anode reaction product of borane produced by discharge of the borohydride ion and said solvent.

5. That method of making a boron hydride comprising electrolyzing with an inert anode an ionic borohydride, $M(BH_4)_x$, where M is an ion of the group consisting of alkali metal and alkaline-earth metal, and $x$ is the valence of the M ion, in a fused salt electrolyte inert to said borohydride and thereby producing at the anode a borane, and recovering the borane so produced.

6. That method comprising electrolyzing with an inert anode a borohydride of the formula $M(BH_4)_x$, where M is an ion selected from the group consisting of alkali metal and alkaline-earth metal, and $x$ is the valence of the M ion, in a non-aqueous solvent inert to said borohydride and selected from the group consisting of liquid ammonia and amines and thereby producing at the anode a compound comprising reaction product of said solvent with borane produced by discharge of the borohydride ion at the anode, and recovering the compound so produced.

7. That method of making a borane comprising electrolyzing with an inert anode ionic borohydride $M(BH_4)_x$ in which M is an ion selected from the group consisting of alkali metal and alkaline-earth metal, and $x$ is the valence of the M ion, in a dialkyl ether of a polyglycol inert to said borohydride and thereby producing at the anode a borane of the group consisting of diborane and decomposition products thereof, and recovering the compound so produced.

8. A method according to claim 2 in which the solvent and the anode are both inert to the discharged borohydride ion, and the anodic reaction product is a boron hydride of the group consisting of diborane and decomposition products thereof.

9. A method according to claim 2 in which the anode is reactive with the discharged borohydride ion, and the reaction product recovered is a reaction product of the discharged borohydride ion and the anode.

10. A method according to claim 3 in which the reactive material is bubbled through the electrolytic solution.

11. A method according to claim 3 in which the reactive material is dissolved in said solvent.

12. A method according to claim 5, said electrolyte being a low melting mixture of alkali metal halides.

13. A method according to claim 6, said reaction product being a borane ammoniate.

14. A method according to claim 6, said reaction product being an amine-borane.

15. That method of making a reaction product of borane ($BH_3$) comprising electrolyzing with an inert anode sodium borohydride in a non-aqueous solvent inert thereto and thereby producing at the anode a compound of the group consisting of boron hydrides and reaction products of boron hydrides and the solvent, and recovering the compound so produced.

16. A method according to claim 15, said solvent being fused salt.

17. A method according to claim 16, said solvent being a low melting mixture of alkali metal halides.

18. A method according to claim 15, said solvent being liquid ammonia, and said product being a borane ammoniate.

19. A method according to claim 15, said solvent being an amine, and said product being an amine-borane.

20. A method according to claim 15, said solvent being a dialkyl ether of a polyglycol, and said product being a borane.

21. A method according to claim 15, said solvent being a primary amine, and said product being a borazene derivative.

References Cited in the file of this patent

Chemical Abstracts, vol. 27 (1933), col. 9113.
Chemical Abstracts, vol. 25 (1931), col. 53611.
An Introduction to the Chemistry of the Hydrides, by D. T. Hurd, John Wiley & Sons, N.Y., 1952, pp. 2, 3, 25, 26, 53, 63, 64.
Boron Hydrides and Related Compounds, by Wm. H. Schechter et al., Callery Chemical Co., declassified Jan. 5, 1954, Dept. of the Navy, Bureau of Aeronautics, pp. 39, 40.
Quarterly Reviews (London), vol. 9, No. 2 (1955), pp. 196–199 (part of an article by F. G. A. Stone).
31 Chem. Rev. (1942), Recent Developments in the Chemistry of the Boron Hydrides by H. I. Schlessinger and A. B. Burg, pages 37, 38.
Stock-Wiberg: Berichte Deutsche Chemische Gesellschaft 65B (1932), pages 1711–24.